(12) United States Patent
Lund

(10) Patent No.: US 8,665,892 B2
(45) Date of Patent: Mar. 4, 2014

(54) METHOD AND SYSTEM FOR ADAPTIVE QUEUE AND BUFFER CONTROL BASED ON MONITORING IN A PACKET NETWORK SWITCH

(75) Inventor: Martin Lund, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 2376 days.

(21) Appl. No.: 11/442,801

(22) Filed: May 30, 2006

(65) Prior Publication Data
US 2007/0280277 A1 Dec. 6, 2007

(51) Int. Cl.
H04L 12/56 (2011.01)
G06F 15/16 (2006.01)

(52) U.S. Cl.
USPC . 370/411; 370/230; 370/395.21; 370/395.41; 370/412; 370/418; 370/352; 370/427; 709/224; 709/231; 709/238

(58) Field of Classification Search
USPC .......................... 370/228–419; 709/224–238
See application file for complete search history.

(56) References Cited

U.S. PATENT DOCUMENTS

| | | | | |
|---|---|---|---|---|
| 4,872,157 A | * | 10/1989 | Hemmady et al. | 370/400 |
| 4,872,158 A | * | 10/1989 | Richards | 370/380 |
| 4,872,159 A | * | 10/1989 | Hemmady et al. | 370/352 |
| 4,872,160 A | * | 10/1989 | Hemmady et al. | 370/353 |
| 4,875,206 A | * | 10/1989 | Nichols et al. | 370/427 |
| 4,893,302 A | * | 1/1990 | Hemmady et al. | 370/427 |
| 4,894,824 A | * | 1/1990 | Hemmady et al. | 370/380 |
| 4,896,319 A | * | 1/1990 | Lidinsky et al. | 370/427 |
| 4,897,874 A | * | 1/1990 | Lidinsky et al. | 726/13 |
| 4,899,333 A | * | 2/1990 | Roediger | 370/427 |
| 4,922,486 A | * | 5/1990 | Lidinsky et al. | 370/427 |
| 4,942,574 A | * | 7/1990 | Zelle | 370/400 |
| 4,958,341 A | * | 9/1990 | Hemmady et al. | 370/352 |
| 4,977,582 A | * | 12/1990 | Nichols et al. | 375/371 |
| 6,021,132 A | * | 2/2000 | Muller et al. | 370/412 |
| 6,501,757 B1 | * | 12/2002 | Kamaraj et al. | 370/395.41 |
| 6,708,213 B1 | * | 3/2004 | Bommaiah et al. | 709/226 |
| 6,791,947 B2 | * | 9/2004 | Oskouy et al. | 370/238 |
| 6,888,835 B2 | * | 5/2005 | Reeve | 370/395.52 |
| 6,912,637 B1 | * | 6/2005 | Herbst | 711/167 |
| 6,917,984 B1 | * | 7/2005 | Tan | 709/238 |
| 6,954,796 B2 | * | 10/2005 | Tan et al. | 709/231 |
| 7,099,336 B2 | * | 8/2006 | Kalkunte et al. | 370/398 |
| 7,355,970 B2 | * | 4/2008 | Lor | 370/231 |
| 7,424,026 B2 | * | 9/2008 | Mallila | 370/413 |
| 2002/0021701 A1 | * | 2/2002 | Lavian et al. | 370/401 |
| 2003/0210651 A1 | * | 11/2003 | Tzeng et al. | 370/231 |
| 2004/0003069 A1 | * | 1/2004 | Wong | 709/223 |
| 2004/0076161 A1 | * | 4/2004 | Lavian et al. | 370/395.41 |
| 2004/0215804 A1 | * | 10/2004 | Tan | 709/231 |
| 2004/0215805 A1 | * | 10/2004 | Tan et al. | 709/231 |
| 2004/0267982 A1 | * | 12/2004 | Jackson et al. | 710/52 |
| 2005/0089054 A1 | * | 4/2005 | Ciancaglini et al. | 370/412 |
| 2007/0280277 A1 | * | 12/2007 | Lund | 370/412 |

* cited by examiner

Primary Examiner — Ayaz Sheikh
Assistant Examiner — Venkatesh Haliyur
(74) Attorney, Agent, or Firm — Thomas | Horstemeyer, LLP

(57) ABSTRACT

Certain aspects of a method and system for adaptive queue and buffer control based on monitoring in a packet network switch are disclosed. Aspects of one method may include pre-allocating packet buffers from a pool of packet buffers in a network switching device based on anticipation of a type of application data being handled by a particular port of the network switching device according to packet classification and tracking. The buffers may be dynamically allocated and deallocated from the pool of packet buffers for a particular port of the network switching device based on changes to the application data.

22 Claims, 16 Drawing Sheets

METHOD AND SYSTEM FOR ADAPTIVE QUEUE AND BUFFER CONTROL BASED ON MONITORING IN A PACKET NETWORK SWITCH

CROSS-REFERENCE TO RELATED APPLICATIONS/INCORPORATION BY REFERENCE

This application makes reference to:

U.S. application Ser. No. 11/442,745, filed on even date herewith;

U.S. application Ser. No. 11/442,850, filed on even date herewith;

U.S. application Ser. No. 11/443,382, filed on even date herewith; and

U.S. application Ser. No. 11/442,928, filed on even date herewith.

Each of the above stated applications is hereby incorporated herein by reference in its entirety.

FIELD OF THE INVENTION

Certain embodiments of the invention relate to network switches. More specifically, certain embodiments of the invention relate to a method and system for adaptive queue and buffer control based on monitoring in a packet network switch.

BACKGROUND OF THE INVENTION

In a telecommunications network, a switch is a device that channels incoming data from any of a plurality of input ports to at least one output port that will communicate the data toward its intended destination. In the traditional circuit-switched telephone network, one or more switches are used to set up a dedicated temporary connection or circuit for an exchange between two or more parties. On an Ethernet local area network (LAN), a switch determines which output port to forward a particular packet frame based on the medium access control (MAC) address of the received packet frame. In a packet switched IP network, a switch may determine which output port to use to route the network packet based on the IP address of each packet.

Various software algorithms and applications have been developed to discover the topology of a network and detect the presence of loops in a network. Whenever a loop is detected, the traffic on those ports that form the loop may be blocked. A blocked port may not be used to forward traffic since it would result in the forwarded traffic being looped back and subsequently received at the output port from which it was communicated. Standardized protocols such as spanning tree and rapid spanning tree are utilized to detect and prevent occurrences of loops within a network. Such methods for detecting and preventing loops may be referred to as active methods.

A loop generally creates a high concentration of traffic, which excludes other applications from communicating data over the input and output ports that form the loop. If a sufficient amount of switch ports are placed in a loop, this may render the switch inoperable. This may occur in instances where traffic in a loop is also being broadcasted to other ports and may reduce those portions of a network that is served solely by the switch.

Quality of Service (QoS) is an IP concept and uses tools and protocols that are designed to aid the provision of defined predictable data transfer characteristics. Quality of Service is also relevant at layer 2 within the Ethernet environment and also within the WAN technologies such as Frame Relay and ATM. The drive for QoS has become very strong in recent years because there has been a growth of multimedia traffic such as voice and video, which mixes it with more traditional data traffic such as file transfer protocol (FTP), Telnet and server message block (SMB). Applications such as Voice over IP (VoIP) and various conferencing applications, for example, Microsoft's Netmeeting have opened up the possibility of more interactive communications between users not just over a LAN but also over a WAN.

While data traffic such as text may be tolerant of delays and dropped packets, voice traffic is very sensitive to and therefore, very intolerant of delays. Video is also intolerant of jitter and packet loss, plus it has the added complication of being very bursty at times. This convergence of multimedia traffic with traditional data traffic is set to grow and therefore requires methods and tools to ensure that providers may deliver networks that give the users confidence to use these tools effectively.

There may be a plurality of problems associated with providing a QoS for a network, for example, there may be a shortage of bandwidth because network links are oversubscribed. The packets may be lost due to congestion at bursty periods. There may be an end-to-end delay comprising for example, a fixed switch delay as packets are layer 2 switched from the call initiator, a fixed encoding delay, a fixed voice activity detection (VAD) around 5 ms, a fixed packetization delay, a variable output queuing delay as voice packets enter an output queue and wait for the preceding frame to be played out, and a fixed serialization delay for the time it takes to get the bits on to the circuit. The end-to-end delay may also comprise a fixed processing delay for the time it takes for the packets to be examined, routed, and managed, a variable network queuing delay due to clocking frames in and out of the different network switches, a fixed network propagation delay as the packets traverse the medium, a variable input queuing delay as voice packets enter an input queue and wait for the preceding frame to be played out, a fixed dejitter buffer delay, a fixed switch delay as packets are layer 2 switched to the endpoint, a fixed decoding delay.

High bandwidth multimedia applications may be introduced to a data network that has a well designed core and access topology, particularly if the core is based on Gigabit Ethernet technology and the access switches are not oversubscribed with respect to the backbone links. Even in this scenario there is the issue of speed mismatches between technologies such as Gigabit Ethernet and Fast Ethernet. This requires buffering and therefore leads to a requirement to queue and prioritize traffic. Layer 2 switches may mark frames using Class of Service (CoS) marking if end devices do not mark the frames themselves. These frames may then be assigned to hardware queues that exist on modern layer 2 switches. The most significant network bottlenecks exist at the remote access points, the WAN access, Internet access and the servers. Many of the technologies involved in QoS deal with how packets are dealt with as they enter and leave a network because merely adding more bandwidth at the edge is only a short term solution that just resolves capacity and perhaps some congestion problems. Adding bandwidth does not resolve jitter or add any traffic prioritization features.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for adaptive queue and buffer control based on monitoring in a packet network switch, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for adaptive queue and buffer control based on monitoring in a packet network switch. Certain aspects of the invention may provide a method and system for pre-allocating packet buffers from a pool of packet buffers in a network switching device based on anticipation of a type of application data being handled by a particular port of the network switching device according to packet classification and tracking. The buffers may be dynamically allocated and deallocated from the pool of packet buffers for a particular port of the network switching device based on changes to the application data.

Certain embodiments of the invention may comprise determining whether a queue in the network switching device that stores the classified plurality of received network packets based on the assigned priority level exceeds a threshold value within a time period. At least a second portion of memory may be allocated to the queue in the network switching device, if the queue in the network switching device that stores the classified plurality of received network packets based on the assigned priority level exceeds the threshold value within the time period.

A packet type may be referred to as a class of frames. For example, Internet control message protocol (ICMP) frames, Ethernet multicast or Broadcast frames, an Ethernet frame with a specific frame type value or with a particular virtual local area network (VLAN) ID. The frames that may be rate limited may comprise TCP synchronous (SYN) frames, other transport connection requests, ICMP frames, address resolution protocol (ARP) and reverse address resolution protocol (RARP), one or more of which may be utilized by attacks to change the state of a server. The TCP SYN may be a single bit in a field of six control bits in a TCP header. The SYN bit may be utilized to synchronize sequence numbers in order to ensure that every octet in a given TCP packet may be received and acknowledged. A packet type may be a characteristic that may be present in a frame or a multitude of frames that are, for example, a login request for a protocol. For example, iSCSI or a frame or a group of frames carrying some credential or connection request information. The packet type may comprise a complete field or portions of any of the above fields or any combination of fields or sub fields or wild cards.

Figure 1A:
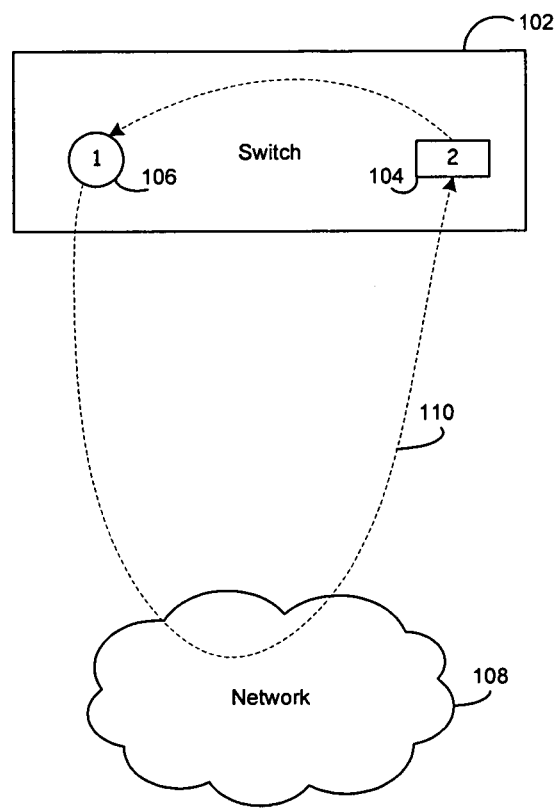
FIG. 1A is a diagram illustrating an exemplary loop in a network that may be utilized in connection with an embodiment of the invention.

FIG. 1A is a diagram illustrating an exemplary loop in a network that may be utilized in connection with an embodiment of the invention. Referring to FIG. 1A, there is shown a packet network switch 102, a network 108 and a network loop data path 110. The packet network switch 102 may comprise an input port 2 104 and an output port 1 106.

The loop 110 illustrates data being communicated from the output port 1 106 of the packet network switch 102 through the network 108 and being received at an input port 2 104 of the packet network switch 102. The same data that is received at the input port 2 104 may be then communicated back to the output port 1 106, thereby creating a loop. A loop 110 may occur when data is transmitted from the first output switch port 106, received at a first input port 104 of the same switch 102 and is communicated back to the first output switch port 106.

In accordance with various embodiments of the invention, a passive methodology may be utilized to detect and handle loops that may occur in a network 108. This may be utilized in instances where the spanning tree or rapid spanning tree algorithm is not running. Each frame handled by the switch 102 may be tracked by a classifier that examines each frame to determine its identity. For example, a hashing operation may be performed across each received frame and the corresponding hash information related to each frame may be stored, for example, in a table in memory. The hash information may be examined to determine whether there are multiple occurrences of the same received frame. The accuracy of the hashing algorithm may adequately detect multiple frame occurrences. If examination of the hashed information indicates that a frame is to be communicated through the switch 102 at a rate that may exceed a threshold or other determined rate, then this may indicate the presence of a loop in the network 108. In most networks, this may be a fair assumption since there would be no value in sending the same information through the switch constantly, except for testing purposes.

Figure 1B:
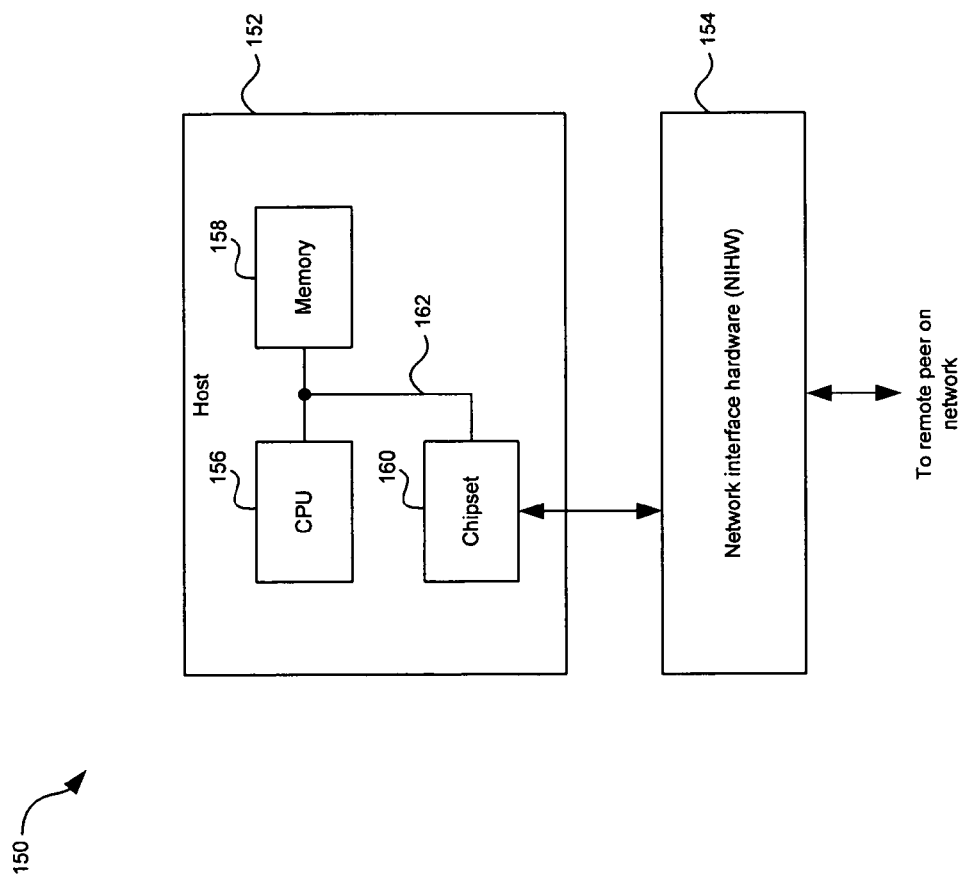
FIG. 1B is a block diagram illustrating a host with a separate network interface hardware (NIHW) block, in accordance with an embodiment of the invention.

FIG. 1B is a block diagram illustrating a host with a separate network interface hardware (NIHW) block, in accordance with an embodiment of the invention. Referring to FIG. 1B, there is shown a networking system 150, such as a server, a client, or a similar network machine, for example, that may comprise a host 152 and a network interface hardware (NIHW) device 154. The host 152 may comprise a central processing unit (CPU) 156, a memory 158, and a chipset 160. The CPU 156, the memory 158, and the chipset 160 may be communicatively coupled via, for example, a bus 162.

The networking system 150 may enable operation or support of various networking protocols. For example, the networking system 150 may enable supporting of transport control protocol/Internet protocol (TCP/IP) connections. In this regard, the networking system 150 may enable supporting of Internet control message protocol (ICMP), address resolution protocol (ARP), stream control transmission protocol (SCTP), and/or path maximum transmission unit (PMTU) discovery protocol, for example. The ICMP protocol may refer to an ISO/OSI layer 3 protocol that may allow routers, for example, to send error and/or control messages about packet processing on IP networks. The ARP protocol may refer to a low-level protocol within the TCP/IP suite that may map IP addresses to corresponding Ethernet addresses. The SCTP may support the transport of public switched telephone networks (PSTN) signaling messages over connectionless packet networks such as IP networks, for example. The PMTU may refer to a maximum unit of data that may be sent given a physical network medium. In other embodiments, SCTP may be used as the transport protocol rather than TCP.

The host 152 may enable setup parameters for network connections. For example, the host 152 may setup transport layer parameters comprising information that support time stamping, window scaling, delayed acknowledgment policy, flow control scheme to be used, congestion handling, selective acknowledgement (SACK), buffers to be used, and/or other transport related parameters. The host 152 may also setup network layer parameters comprising information that supports IPv4 or IPv6, for example, and options such as no fragments and/or hop limit. The host 152 may also setup data link layer parameters comprising information that supports virtual local area networks (VLAN) and source address to be used, for example.

The CPU 156 may comprise suitable logic, circuitry, and/or code that may enable supporting of the management and/or performance of networking operations associated with remote peers or clients on a network. The CPU 156 may also enable supporting of the management and/or performance of service applications that may be provided to the remote clients on the network.

The memory 158 may comprise suitable logic, circuitry, and/or code that may enable storage of information regarding the networking operations and/or service applications supported by the CPU 156. The chipset 160 may comprise suitable logic, circuitry, and/or code that may enable supporting of memory management, PCI master and arbitrator, graphics interface, I/O master for USB, audio, and/or peripheral devices, for example. In this regard, the chipset 160 may comprise at least one integrated circuit (IC) that provides services in support of the CPU 156 operations. In some instances, the services provided by the chipset 160 may be implemented in separate ICs. The choice of one or more ICs for implementing the chipset 160 may be based on the number and/or type of services provided.

The NIHW device 154 may comprise suitable logic, circuitry, and/or code that may enable communication with the host 152. In this regard, the NIHW device 104 may enable communication with the CPU 156, the memory 158, and/or the chipset 160. In some instances, the number of network connections that may be supported by the NIHW device 154 may be different than the number of network connections that may be supported by the host 152. For example, when the host 152 supports 10,000 connections and the NIHW device 154 supports 1,000 connections, then a connection ratio of 10:1 is supported by the networking system 150. In another example, if the host 152 supports 2,000 connections and the NIHW device 104 supports 1,000 connections, then a connection ratio of 2:1 is supported by the networking system 150. The connection ratio of a networking system that comprises a host and an NIHW device may be utilized when determining a connection setup model for a particular application.

Figure 1C:
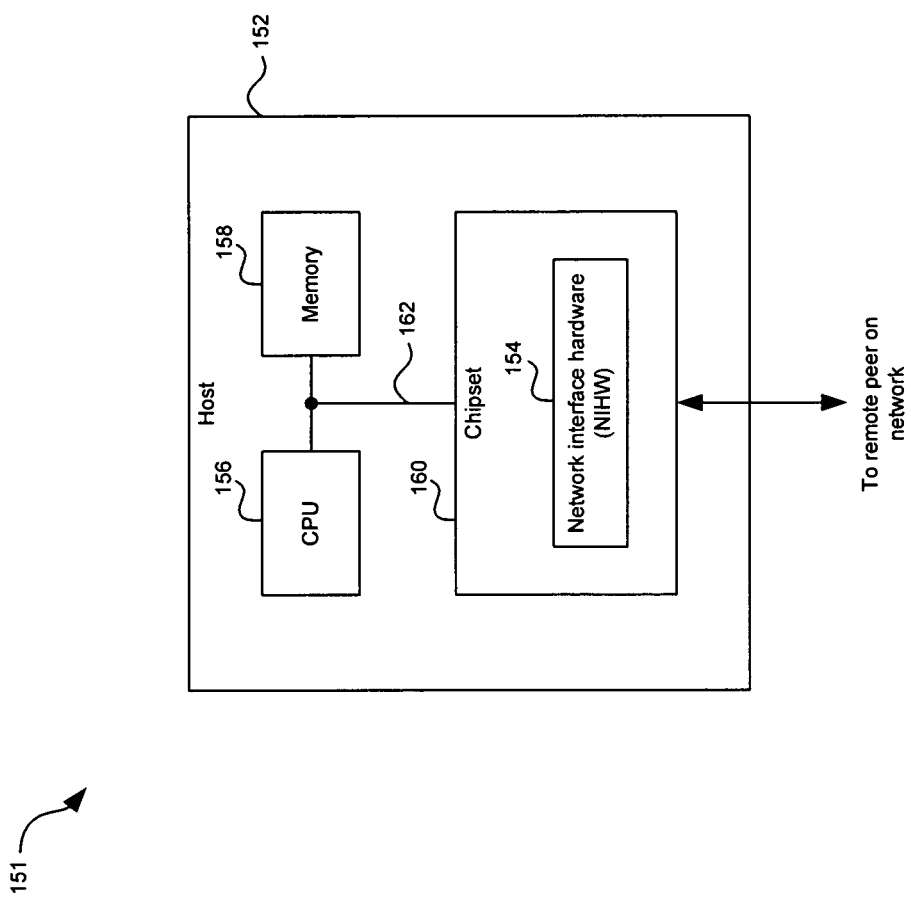
FIG. 1C is a block diagram illustrating a host with a network interface hardware block integrated within a chipset, in accordance with an embodiment of the invention.

FIG. 1C is a block diagram illustrating a host with a network interface hardware block integrated within a chipset, in accordance with an embodiment of the invention. Referring to FIG. 1C, there is shown a networking system 151 that may differ from the networking system 150 in FIG. 1B in that the NIHW device 154 in FIG. 1B is integrated into the chipset 160. In this regard, the NIHW device 154 may enable communication with other portions of the chipset 160, and with the CPU 156, and/or the memory 158 via the bus 162. The NIHW device 154 may comprise a classifier that may enable classification of received network packets.

Figure 1D:
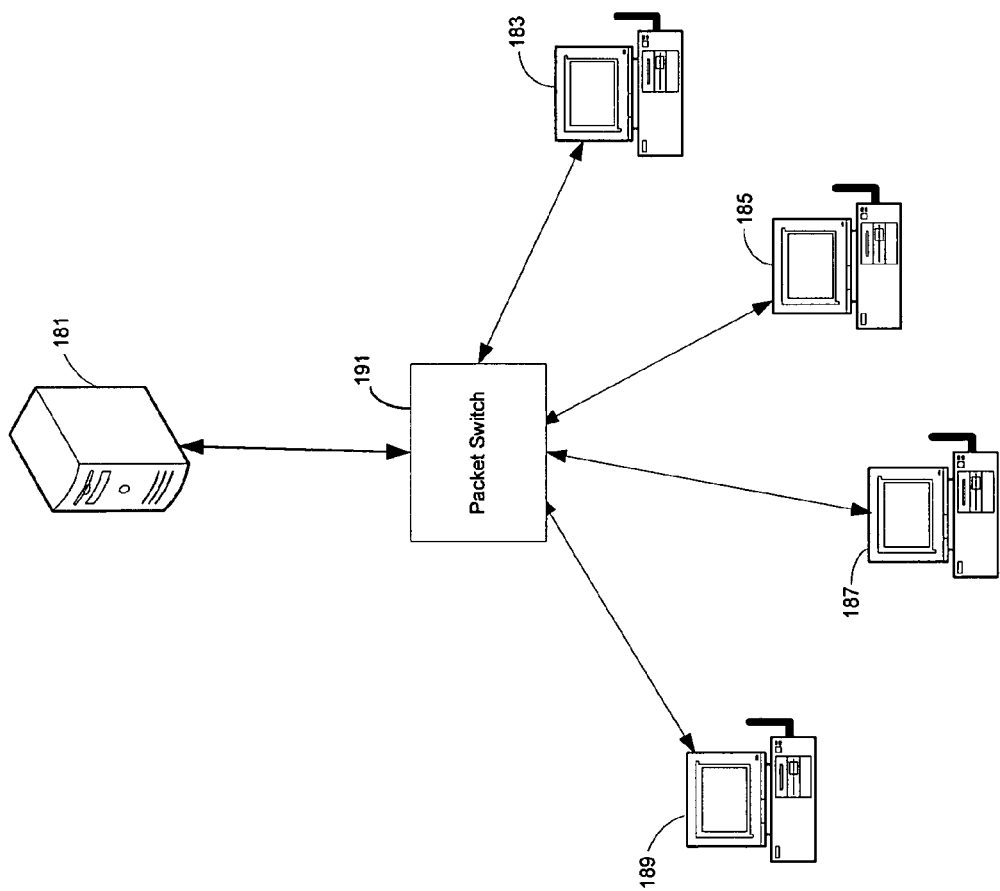
FIG. 1D is a block diagram of an exemplary packet switched network that may be utilized in accordance with an embodiment of the invention.

FIG. 1D is a block diagram of an exemplary packet switched network that may be utilized in accordance with an embodiment of the invention. Referring to FIG. 1D, there is shown a host 181, a packet switch 191, and a plurality of clients, client 183, client 185, client 187 and client 189. The host 181 may comprise suitable logic, circuitry and/or code that may be enabled to limit its new connection acceptance rate or the number of suspected frames of a known profile, for example, Internet control message protocol (ICMP) in order to make sure that attacks may not disrupt its service level to legitimate clients.

The plurality of clients 183, 185, 187 and 189 may comprise suitable logic, circuitry and/or code that may be located on the premises of a customer, for example, data termination equipment such as routers. The packet switch 191 may comprise suitable logic, circuitry and/or code that may be enabled to provide clocking and switching services in a network. The plurality of clients 183, 185, 187 and 189 may be coupled to the packet switch 191 by a physical layer component and a link layer component. The physical layer component may define the mechanical, electrical, functional, and procedural specifications for the connection between the devices, for example, the RS-232 specification. The link layer component may define the protocol that establishes the connection between the plurality of clients 183, 185, 187 and 189 and the packet switch 191.

The host 181 may comprise suitable logic, circuitry and/or code that may be enabled to limit its new connection acceptance rate or the number of suspected frames of a known profile, for example, Internet control message protocol (ICMP) in order to make sure that attacks may not disrupt its service level to legitimate clients.

Figure 2:
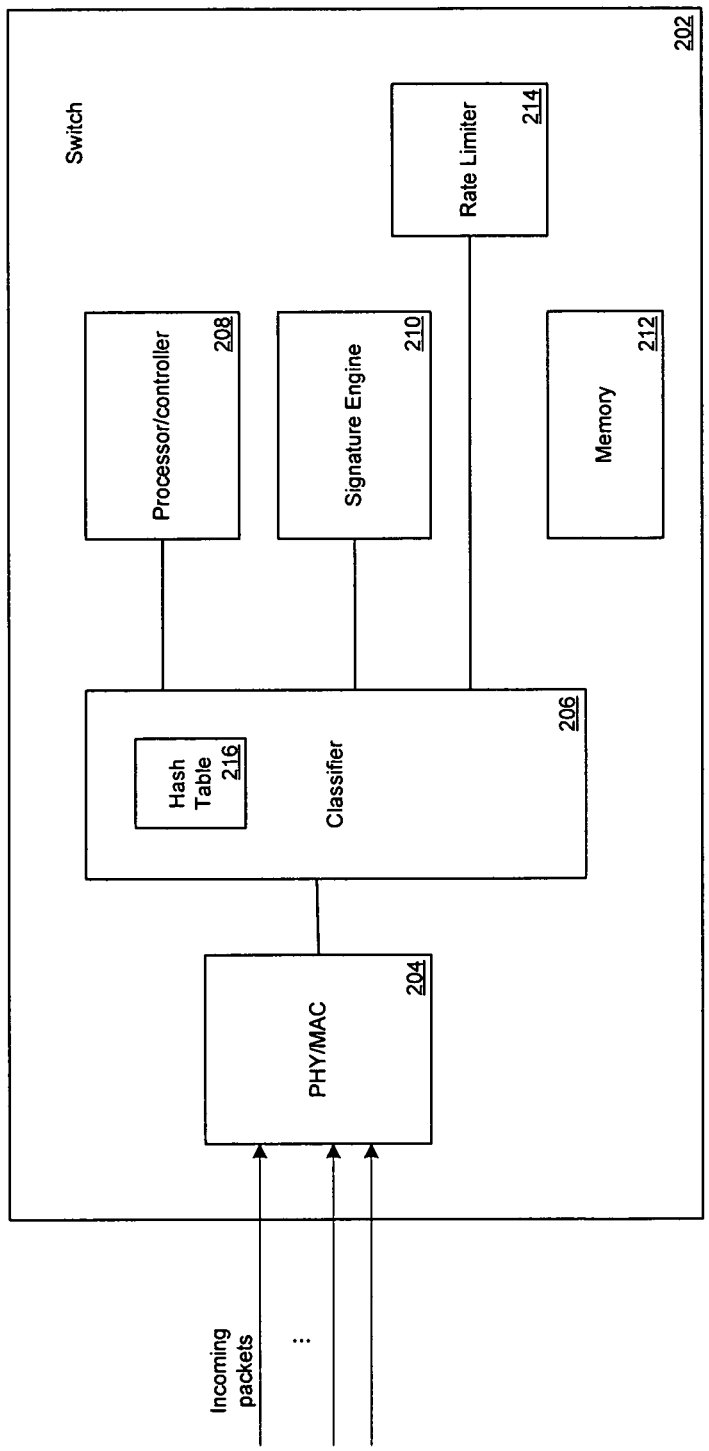
FIG. 2 is a diagram that illustrates a system for passive loop detection and prevention, in accordance with an embodiment of the invention.

FIG. 2 is a diagram that illustrates a system for passive loop detection and prevention, in accordance with an embodiment of the invention. Referring to FIG. 2, there is shown a switch 202. The switch 202 comprises a physical (PHY)/(medium access control) MAC layer block 204, a packet classifier 206, a processor/controller 208, a signature engine 210, a rate limiter 214 and a memory 212. The packet classifier 206 may comprise a hash table 216.

The PHY/MAC layer block 204 may comprise suitable logic, circuitry and/or code that may enable managing and maintaining of physical layer and MAC layer communications between base stations by coordinating access to a shared channel, for example, a wired channel or a wireless channel and utilizing protocols that enhance communications over a network medium. The PHY/MAC layer block 204 may enable receiving of the incoming network packets and may enable generation of the received packets, which may be communicated to the classifier 206.

The packet classifier 206 may comprise suitable logic, circuitry and/or code that may enable classification of received network packets. There is an increased likelihood of having collisions between the received network packets if, for example, a 4 byte cyclic redundancy check (CRC) is utilized, due to the limited number of bits being used. A 64 byte CRC may be utilized to reduce the likelihood of collisions between the network packets. To further decrease the likelihood of collisions, the CRC may be combined with other packet information to generate CRC-like hash information. A CRC is a type of hash function used to produce a checksum, which is a small, fixed number of bits against a block of data, such as a packet of network traffic. The checksum may be used to detect and correct errors after transmission or storage. A CRC may be computed and appended before transmission or storage, and verified afterwards by a recipient in order to confirm that no changes have occurred to the block of data during transmission.

The hash table 216 may be utilized to track a finite number of connection flows. For example, hashed entries for 5000 connection flows may be tracked and once the hash table is filled, a FIFO mechanism may be utilized to purge or eliminate older entries from the hash table in order to make space for newly hashed entries. The hash table 216 may be a data structure that associates keys with values. The hash table 216 may support lookup operations by transforming the key using a hash function into a hash, a number that the hash table 216 uses to locate the desired value.

The processor 208 may comprise suitable logic, circuitry, and/or code that may enable supporting of the management function to keep track of connections or traffic flows at the macro-level state. The macro-level state may indicate that only partial context information is maintained for each connection.

The signature engine 210 may comprise suitable logic, circuitry and/or code that may enable examining of the packets for each connection flow and generate various keys based on the hashed values of the CRC, for example. The signature engine 210 may be enabled to detect the type of packet by examining the header of the incoming packet. Only a portion of the incoming network packet frame may be necessary to detect the type of packet. The rate limit engine 214 may comprise suitable logic, circuitry and/or code that may provide an enforcement function to limit a rate of various connections to a specified rate based on results from the packet classifier 206. It may be more efficient to throttle back a data rate that is associated with a connection than terminating a connection associated with a loop. For example, if a loop is detected for a particular connection, the rate limiter 214 may enable reduce a transmission rate of the connection from a million frames per second to 500 frames per second, for example.

The memory 212 may comprise suitable logic, circuitry and/or code that may enable storage of hash information used for generating the CRC or CRC-type hash information. There may be a tradeoff between accuracy and the amount of memory that is required to store hash information used for generating the CRC or CRC-type hash information.

Figure 3A:
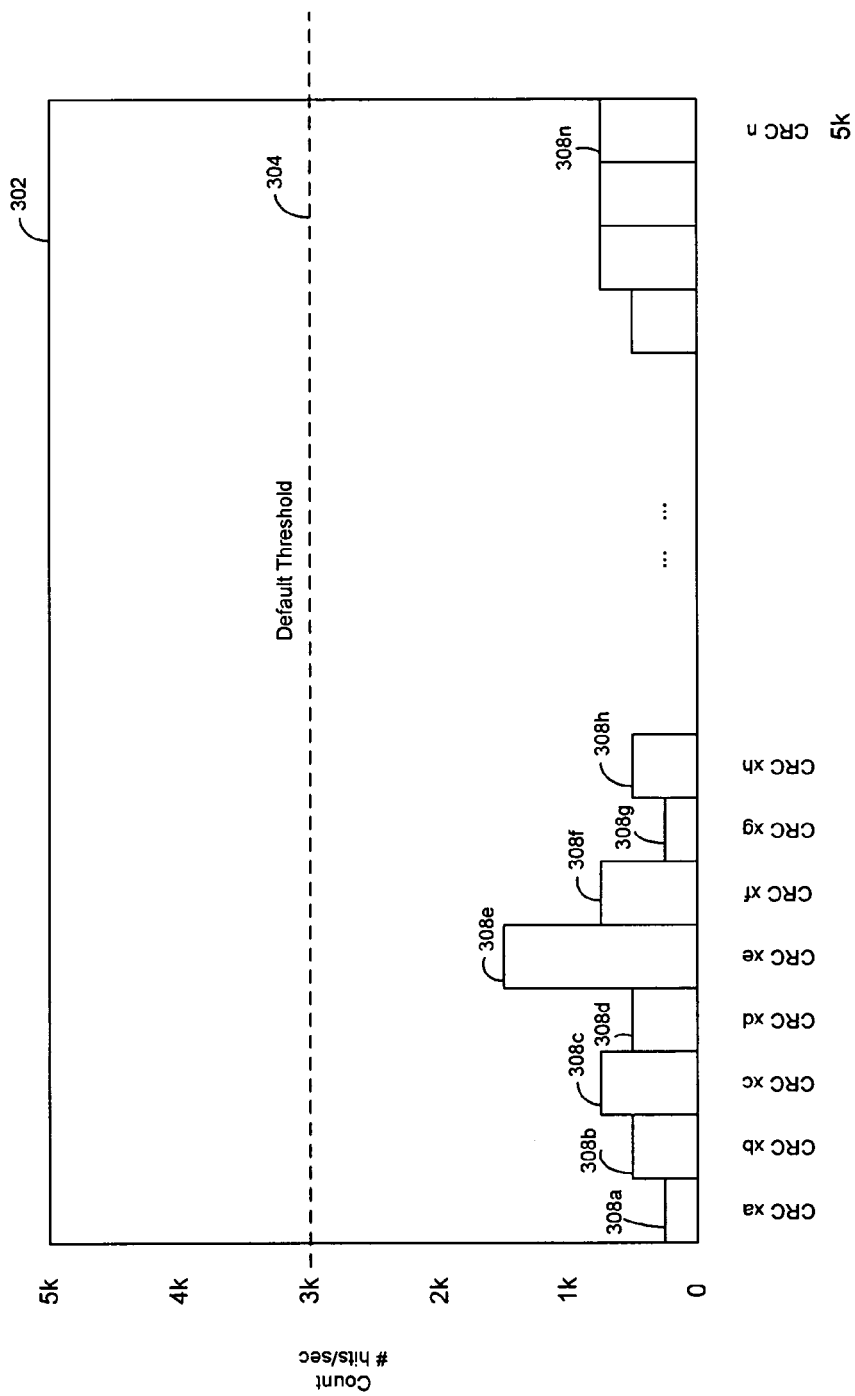
FIG. 3A is a diagram that illustrates an exemplary management function, in accordance with an embodiment of the invention.

FIG. 3A is a diagram that illustrates an exemplary management function, in accordance with an embodiment of the invention. Referring to FIG. 3A, there is shown a graph 302 illustrating a relationship between hashed CRC values and their corresponding counts or number of occurrences. The horizontal axis illustrates the hashed CRC value, namely, CRC xa, CRC xb, CRC xc, CRC xd, CRC xe, CRC xf, CRC xg, CRC xh, ..., CRC n. The vertical axis illustrates the count for each of the corresponding occurrences of the hashed CRC values CRC xa 308a, CRC xb 308b, CRC xc 308c, CRC xd 308d, CRC xe 308e, CRC xf 308f, CRC xg 308g, CRC xh 308h, ..., CRC n 308n. Initially, the hash table may be populated with CRC hash entries until it is full. FIG. 3A illustrates a steady state condition in which there are 5000 entries in the hash table, for example. There is a default threshold 304 of 3000 packets per second, for example. Once the hash table is full, various mechanisms may be utilized to purge or otherwise remove entries from the hash table to make room for newly generated hash entries. For example, a FIFO mechanism may be utilized to remove hash entries. In this regard, the oldest entries in the hash table may be purged or otherwise removed first to make room for the newly generated CRC hash entries.

The first time a particular CRC hash is generated; it may be entered in the hash table with a count of 1. The second time that same CRC hash is generated; the count for that CRC hash entry may be incremented. Subsequent occurrences may result in the count for that CRC hash entry being incremented. In one embodiment of the invention, a threshold may be established for the CRC hash entries. If the rate of the packets exceeds an established threshold, then this may trigger an action such as a reduction in the data rate or terminating the connection.

Figure 3B:
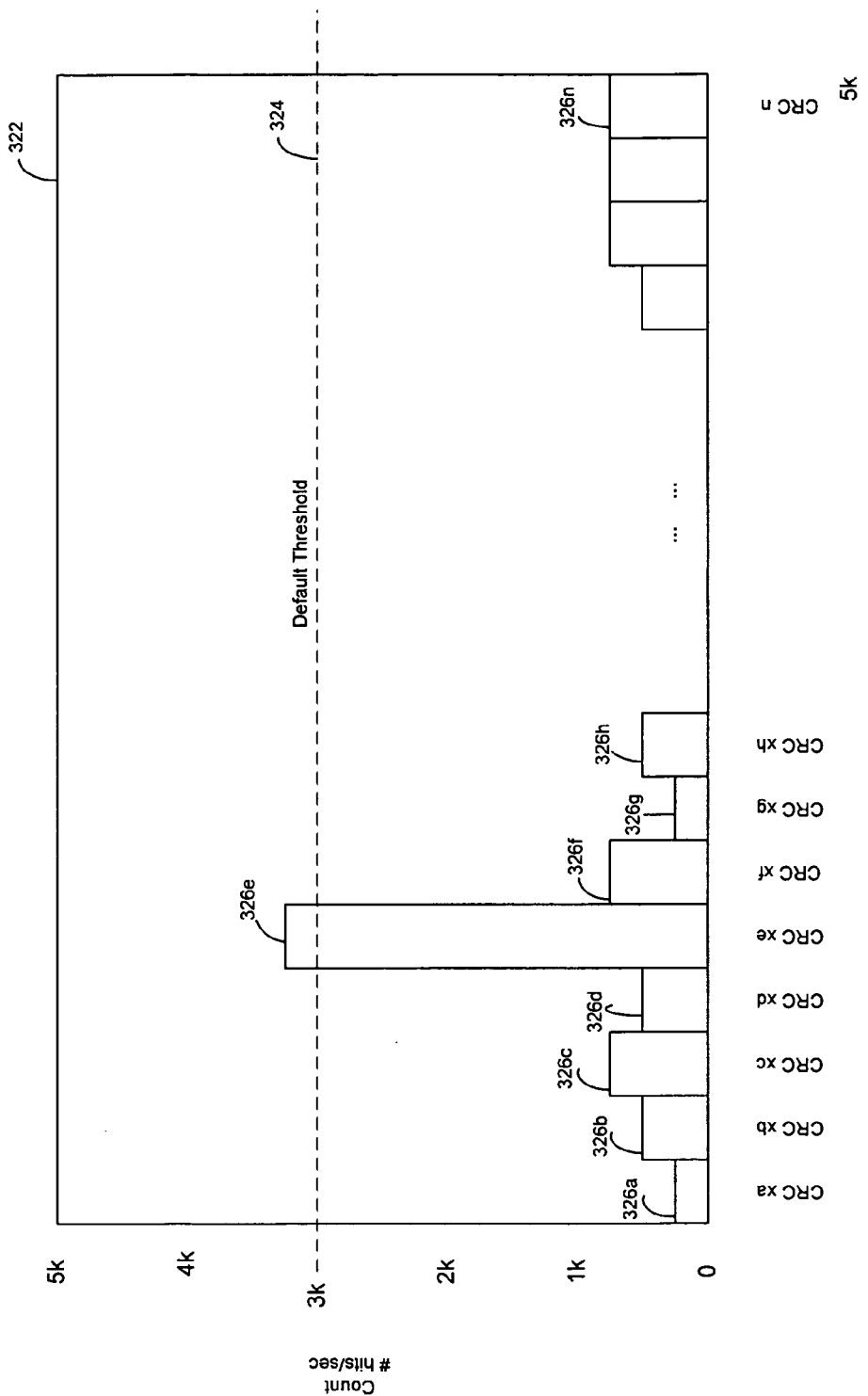
FIG. 3B is a diagram that illustrates an exemplary scenario of a management function in which the default threshold has been exceeded, in accordance with an embodiment of the invention.

FIG. 3B is a diagram that illustrates an exemplary scenario of a management function in which the default threshold has been exceeded, in accordance with an embodiment of the invention. Referring to FIG. 3B, there is shown a graph 322 illustrating a relationship between hashed CRC values and their corresponding counts or number of occurrences. The horizontal axis illustrates the hashed CRC value, namely, CRC xa, CRC xb, CRC xc, CRC xd, CRC xe, CRC xf, CRC xg, CRC xh, ..., CRC n. The vertical axis illustrates the count for each of the corresponding occurrences of the hashed CRC values CRC xa 326a, CRC xb 326b, CRC xc 326c, CRC xd 326d, CRC xe 326e, CRC xf 326f, CRC xg 326g, CRC xh 326h, ..., CRC n 326n.

FIG. 3B illustrates an exemplary scenario in which the number of occurrences of CRC xe 326e exceeds the default threshold 324. Once a threshold has been exceeded, then at least one of a plurality of actions may be triggered and executed by either the rate limiter 214 (FIG. 2) and/or the processor 208. These actions may comprise rate limiting, sending a management alarm, disabling one or more ports handling traffic in a loop, providing a visual or aural indication, and/or CPU redirect, for example.

A visual indication may comprise blinking a LED and an aural indication may comprise generating a beep. The blinking associated with a particular connection of the LED may follow a predefined sequence, for example. Rate limiting may involve blocking or dropping packets. With processor redirect, a copy of information in the hash table along with other connection context information may be copied or otherwise provided to the processor 208 for further analysis. Based on this analysis, the processor 208 may then determine how best to handle the condition and take appropriate actions. The processor 208 may provide an indication to the rate limiter 214, which may instruct the rate limiter 214 to adjust a rate of the corresponding connection accordingly. Context information such as a source port and a destination port, which may be associated with the hash entry for a particular packet, may be utilized to control a port. For example, the rate limiter 214 may use the source port or destination port to limit the data rate of the port or to disable the port.

Figure 3C:
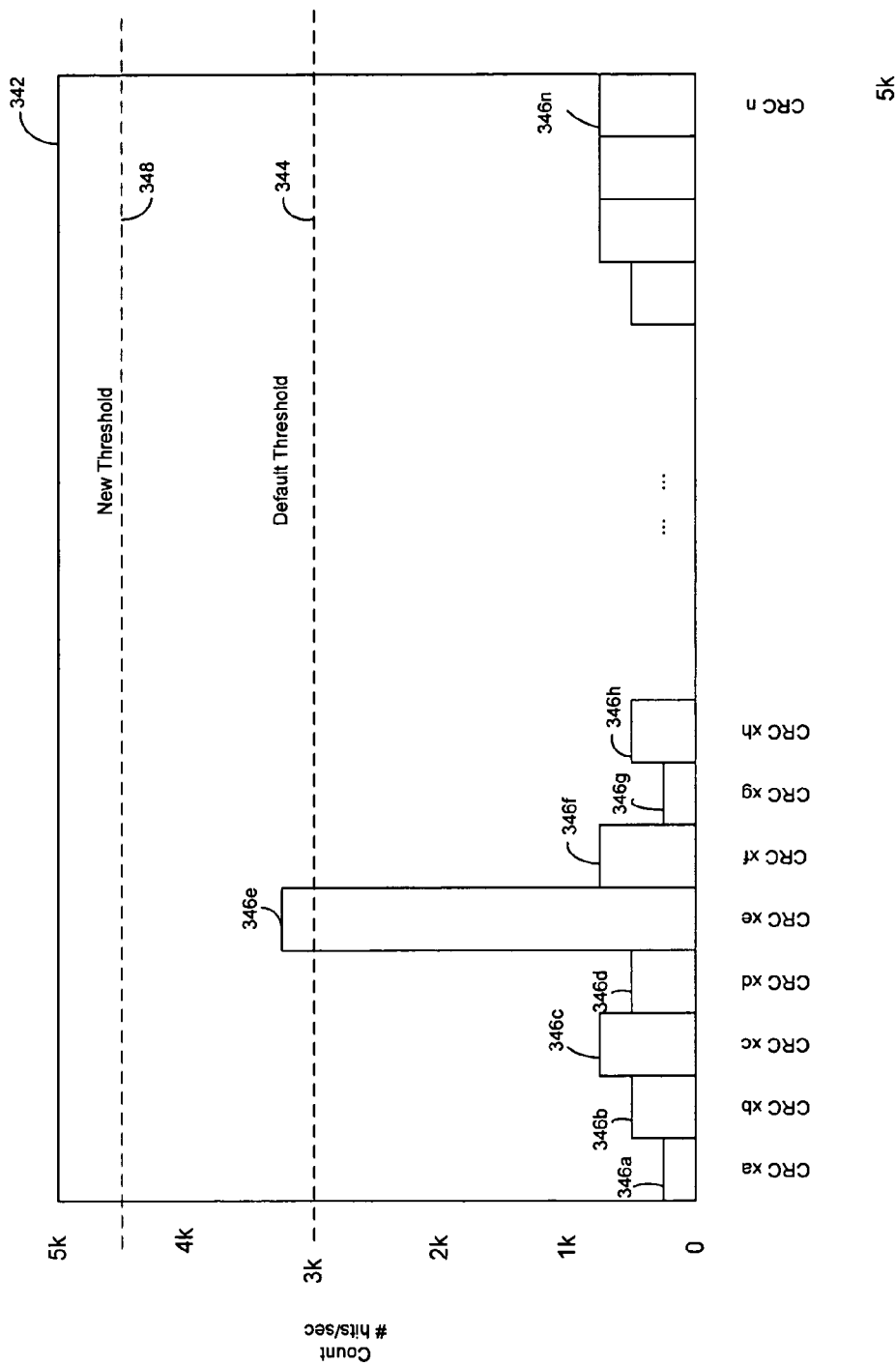
FIG. 3C is a diagram that illustrates an exemplary scenario of a management function with an adaptive threshold, in accordance with an embodiment of the invention.

FIG. 3C is a diagram that illustrates an exemplary scenario of a management function with an adaptive threshold, in accordance with an embodiment of the invention. Referring to FIG. 3C, there is shown a graph 342 illustrating a relationship between hashed CRC values and their corresponding counts or number of occurrences. The horizontal axis illustrates the hashed CRC value, namely, CRC xa, CRC xb, CRC xc, CRC xd, CRC xe, CRC xf, CRC xg, CRC xh, . . . , CRC n. The vertical axis illustrates the count for each of the corresponding occurrences of the hashed CRC values CRC xa 346a, CRC xb 346b, CRC xc 346c, CRC xd 346d, CRC xe 346e, CRC xf 346f, CRC xg 346g, CRC xh 346h, . . . , CRC n 346n. The number of occurrences of CRC xe 346e exceeds the default threshold 344. A new threshold 348 may be implemented at 4500 hits, for example, by the management function.

In this regard, the threshold may be dependent on the type of traffic handled by the connection. For example, if the traffic is largely multimedia traffic, and it is known that this type of environment is prone to loops, then the threshold may be increased to a higher level to more efficiently handle this type of traffic. For example, the threshold may be increased from 3000 to 4500, for example. At least one of a plurality of actions may be taken when a threshold has been reached. A default action may comprise executing a rate limiting action once a threshold has been exceeded. In certain instances, it may be appropriate to drop packets.

In another embodiment of the invention, the type of application running or the type of frame that is being detected may affect the action that may be taken by the processor 208 and/or the rate limiter 214. For example, if a frame is a unicast frame, the threshold may be changed and/or the count modified to favor acceptance of these types of frames. For example, in the case of a unicast frame, the count may be incremented by, for example, every 5 unicast frames for a particular CRC hash value. However, if the frame is a broadcast frame, then the threshold and/or count may be modified to disfavor the acceptance of these types of frames.

Figure 4:
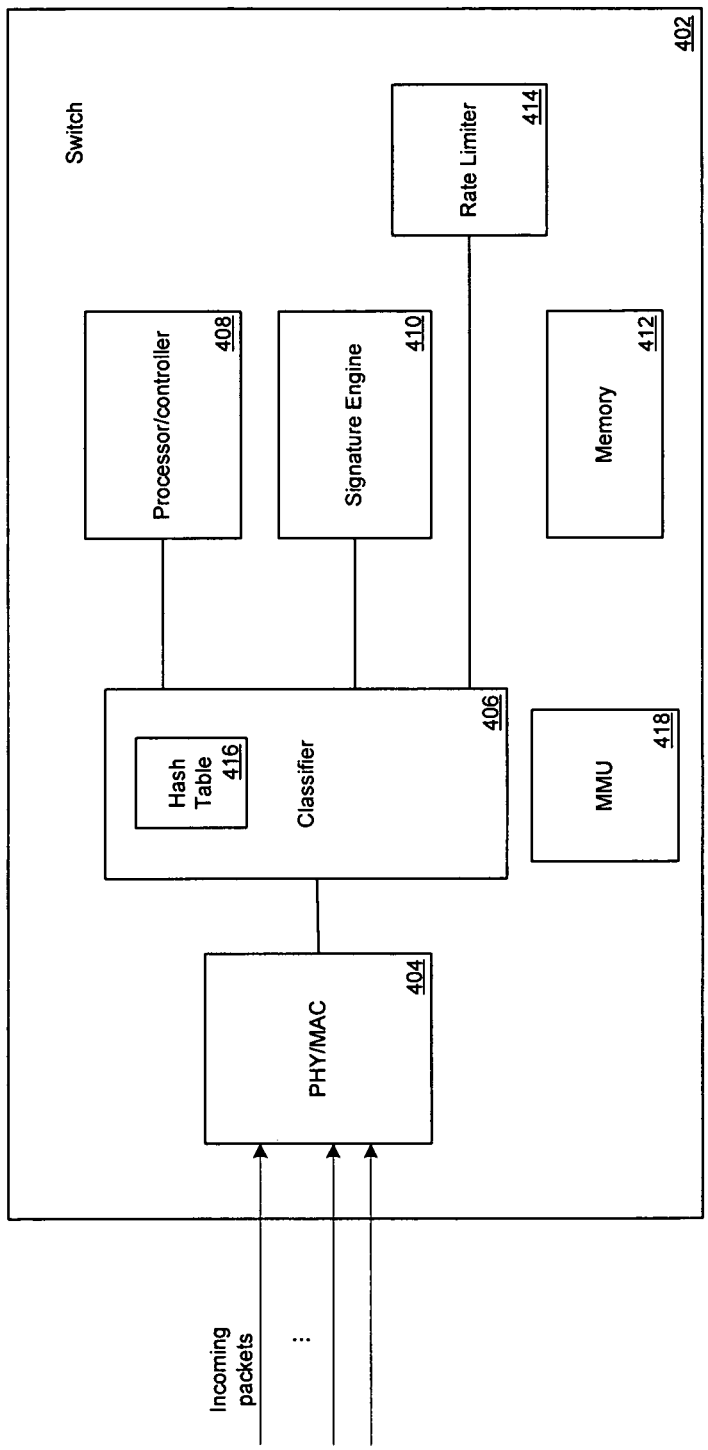
FIG. 4 is a diagram that illustrates an exemplary system for implementing an adaptive queue and buffer control based on monitoring in packet network switches, in accordance with an embodiment of the invention.

FIG. 4 is a diagram that illustrates an exemplary system for implementing an adaptive queue and buffer control based on monitoring in packet network switches, in accordance with an embodiment of the invention. Referring to FIG. 4, there is shown a switch 402. The switch 402 comprises a physical (PHY)/(medium access control) MAC layer block 404, a packet classifier 406, a processor/controller 408, a signature engine 410, a rate limiter 414, a memory management unit (MMU) 418 and a memory 412. The packet classifier 406 may comprise a hash table 416.

The various blocks in FIG. 4 may be substantially as described in FIG. 2. The MMU 418 may comprise suitable logic, circuitry and/or code that may enable managing the storage of data based on the type of data contained in the received network packets determined by the classifier 406 and signature engine 410. The MMU 418 may enable dynamic allocation of buffer or memory based on the type of application running and a state of the traffic currently being received.

Voice packets may be evenly spaced without jitter. Dejitter buffers may be utilized to buffer packets as they are received and then play them out as a steady stream thereby eliminating the variable delay. The overall delay may increase slightly as a result of implementing a de-jitter buffer. The packets that arrive so late that they fall outside of the dejitter buffer may be discarded. The QoS may enable predictable response times, management of delay sensitive applications, management of jitter sensitive applications, and control of packet loss when congestion occurs during a burst. The QoS may also enable setting of traffic priorities, dedication of bandwidth on a per application basis, avoidance of congestion, and management of congestion when it occurs. The QoS may operate on one or more of three levels, for example, best effort, differentiated service and integrated service. The differentiated service may deal with differing levels of QoS on a packet-by-packet basis. The integrated service may request a level of service by an application to a network. Data may be sent after confirmation that the service level is guaranteed to be available.

In operation, the received packets may be marked and classified according to policies and the behavior of the packet traffic based on IP precedence and DSCP and is most effective when carried out as far to the edge of the network as possible, for example, at a VoIP phone. The packet traffic congestion may be managed by prioritizing traffic based on the marks using queuing technologies that may respond to traffic classes. Congestion may be avoided by dropping packets that are not a high priority where low priority packets may be weeded out of a queue. The packet traffic may be regulated so that the ingress or egress of traffic may be limited depending on the class/markings of the packets, which may be known as traffic shaping. Traffic shaping may be performed to maximize the use of bandwidth by specifying peak and average traffic rates. The packets may be fragmented and compressed to maximize the bandwidth usage of WANs.

The Layer 2 Class of Service (CoS) may be provided within the tag control info (TCI) field of an Ethernet frame. The 3 bits give 8 different classes which have the values assigned as follows:

000 (0)—Routine
001 (1)—Priority
010 (2)—Immediate
011 (3)—Flash
100 (4)—Flash Override
101 (5)—Critical
110 (6)—Internetwork Control
111 (7)—Network Control These map to the IP precedence values in the type of service (ToS) field of the IP datagram. Layer 2 switches may have a plurality of queues per port, which may be used during periods of congestion to allocate frames with a particular CoS value into appropriate queues and perform, for example, a weighted round robin (WRR) approach to servicing these queues. Differential Service (Diffserv) is concerned with classifying packets as they enter the local network based on the classification of the flow of packet traffic. The flow of packet traffic may be defined by various elements, for example, a source IP address, a destination IP address, a source port, a destination port and/or the transport protocol. A flow of packet traffic that has been classified or marked may then be acted upon by other QoS mechanisms.

Figure 5A:
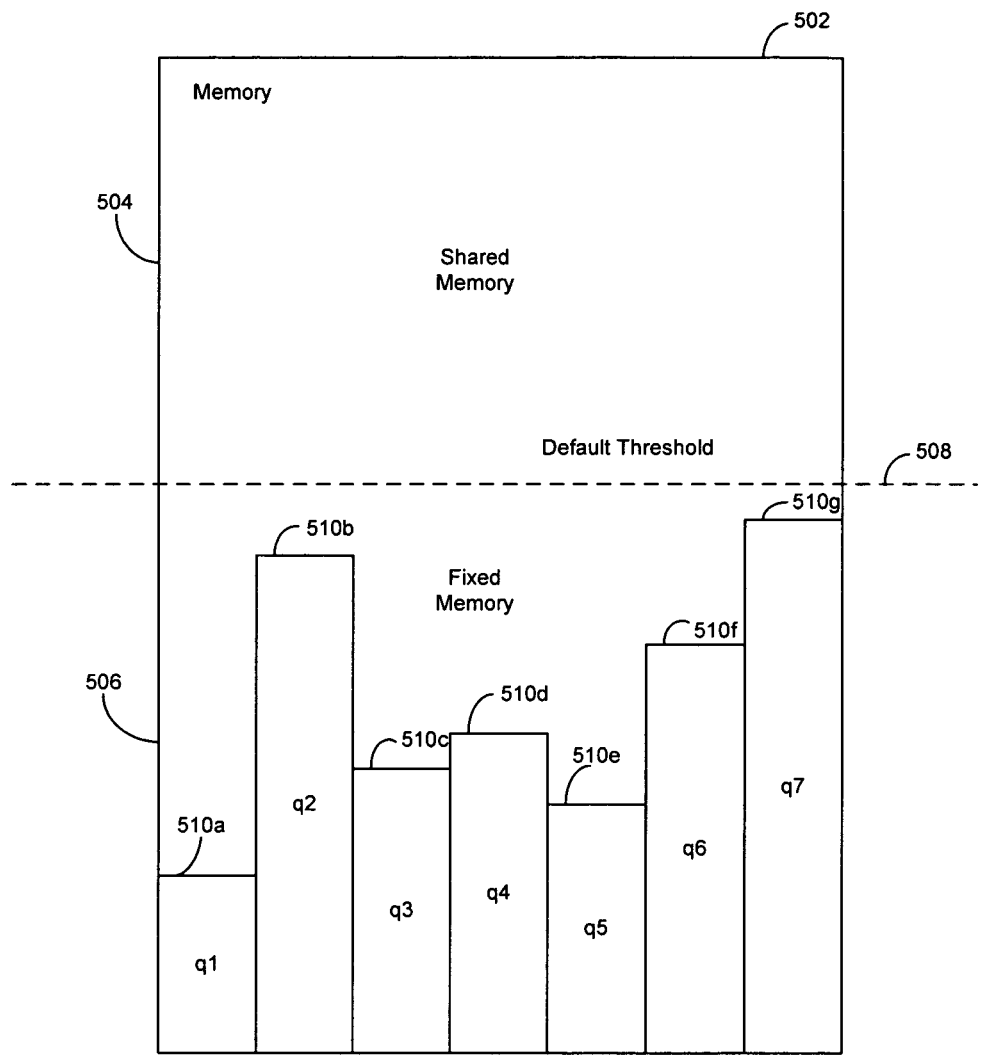
FIG. 5A is a diagram illustrating implementation of an adaptive queue and buffer control based on monitoring in packet network switches, in accordance with an embodiment of the invention.

FIG. 5A is a diagram illustrating implementation of an adaptive queue and buffer control based on monitoring in packet network switches, in accordance with an embodiment of the invention. Referring to FIG. 5A, there is shown a memory 502. The memory 502 may be partitioned into a shared memory 504 and a fixed memory 506 by a default threshold 508. The fixed portion of the memory 506 may be utilized to store a plurality of packet queues, q1 510a, q2 510b, q3 510c, q4 510d, q5 510e, q6 510f, and q7 510g, where each queue is pre-allocated. The shared portion of the memory 504 may be utilized to dynamically allocate any of the queues. The shared memory 504 may be allocable among the plurality of queues. The fixed memory 506 may be pre-assigned or pre-reserved for each queue.

The packet classifier 406 may enable determining the queuing of incoming packet frames based on the type of data contained in the received network packets. Each received packet frame may be associated with an 802.1p priority tag having a priority level of 0-7, for example. In an embodiment of the invention, the packet classifier 406 may assign its own tag to each the received packet frames. At the Internet protocol (IP) level, there is also a differential service code point (DSCP) type of service (TOS), which provides up to 64 levels of priority or classes. VoIP may require a high priority so as to minimize latency and dropping of frames. For example, a VoIP packet may arrive having a high priority and may be placed in a first of 7 output queues, namely (q1) 510a, by the MMU. If a network file system (NFS) frame arrives it may be placed in the seventh queue (q7) 510g, for example, which is larger than the first queue q1 510a as NFS traffic is generally handled by UDP, which is larger than a VoIP packet and very sensitive to dropped frames. As a result, when the NFS frames are being queued in q7 510g, the default threshold 508 is not exceeded.

Figure 5B:
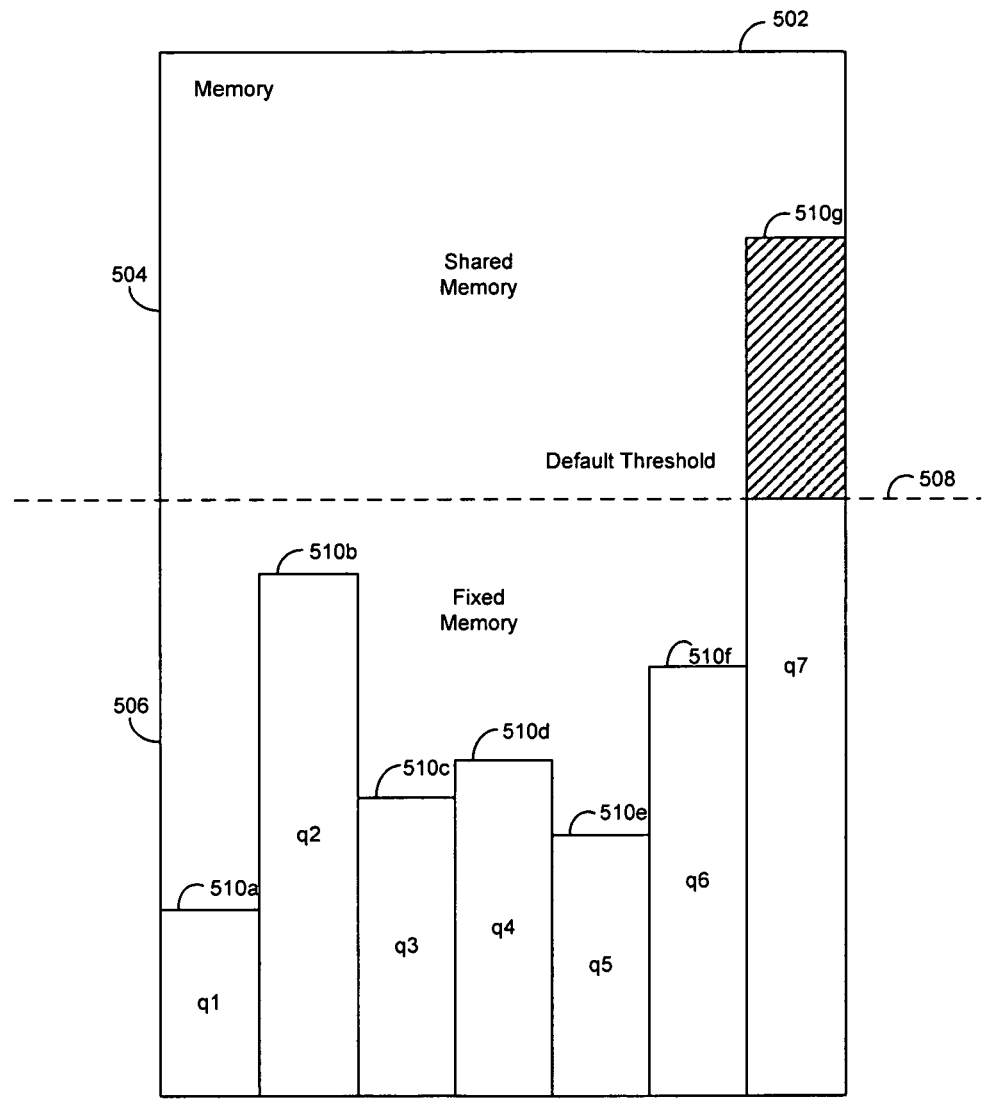
FIG. 5B is a diagram illustrating implementation of an adaptive queue and buffer control where a particular queue receives more data than it may hold, in accordance with an embodiment of the invention.

FIG. 5B is a diagram illustrating implementation of an adaptive queue and buffer control where a particular queue receives more data than it may hold, in accordance with an embodiment of the invention. Referring to FIG. 5B, there is shown a memory 502. The memory 502 may be partitioned into a shared memory 504 and a fixed memory 506 by a default threshold 508. The fixed portion of the memory 506 may be utilized to store a plurality of packet queues, q1 510a, q2 510b, q3 510c, q4 510d, q5 510e, q6 510f, and q7 510g, where each queue is pre-allocated. The shared portion of the memory 504 may be utilized to dynamically allocate any of the queues. The shared memory 504 may be allocable among the plurality of queues. The fixed memory 506 may be pre-assigned or pre-reserved for each queue.

The queue (q7) 510g may receive more NFS data than it may hold. As a result, additional memory may be allocated from the shared memory 504 to q7 510g. This method of allocating additional memory to the queues when needed may be described as a reactionary methodology.

In accordance with an embodiment of the invention, a method and system are provided for allocating memory to the queues based on the states of the actual traffic that is flowing through the switch 102 (FIG. 1A). An application aware mechanism is utilized to manage the queues. In instances where all the flows arrive simultaneously, then it is undesirable to drop any packets. Based on the traffic types that are detected, a guaranteed queue may be dynamically adjusted so as to ensure that there will be sufficient memory available for queuing the received traffic. Accordingly, the fixed portion of the memory 506 allocated for the queues may be adjusted based on the traffic flows instead of when the threshold 508 is exceeded. Since memory is allocated dynamically, there is no fixed portion of the memory that is always present for a particular queue. Hence, the memory is allocated to the queues as needed and deallocated when they are no longer needed. In instances where a queue is no longer required, the resources allocated for that queue may be deallocated and returned to a pool of free memory resources.

Figure 5C:
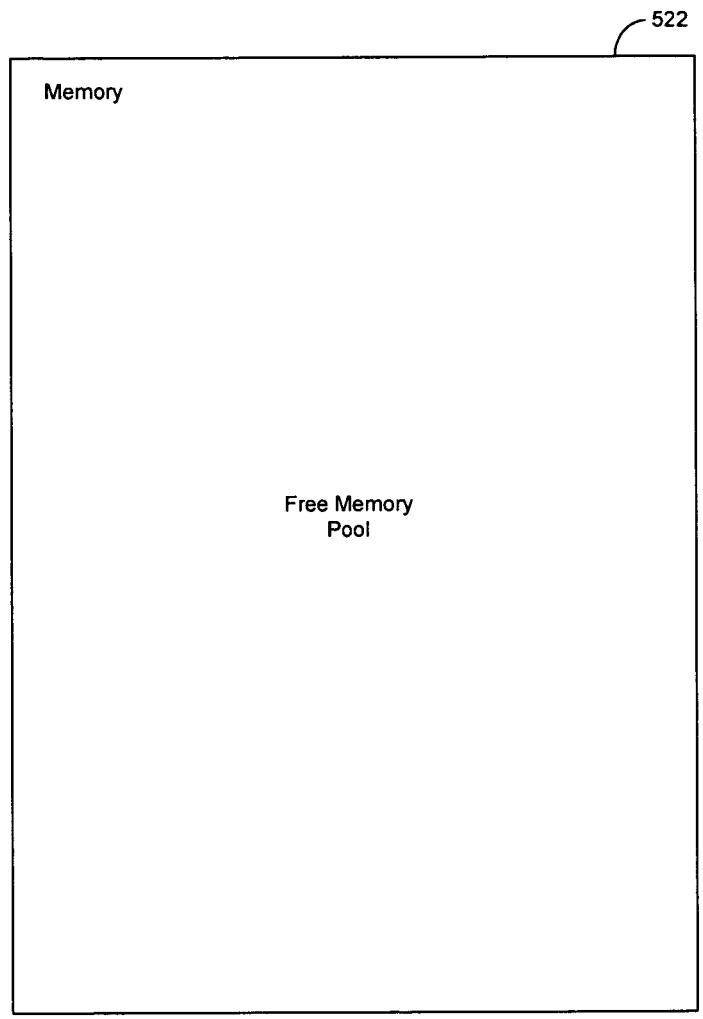
FIG. 5C is a diagram illustrating a pool of memory in which no resources are allocated, in accordance with an embodiment of the invention.

FIG. 5C is a diagram illustrating a pool of memory in which no resources are allocated, in accordance with an embodiment of the invention. Referring to FIG. 5C, there is shown a memory 522 with a free memory pool, where no memory is pre-reserved or pre-allocated for any particular queue.

Figure 5D:
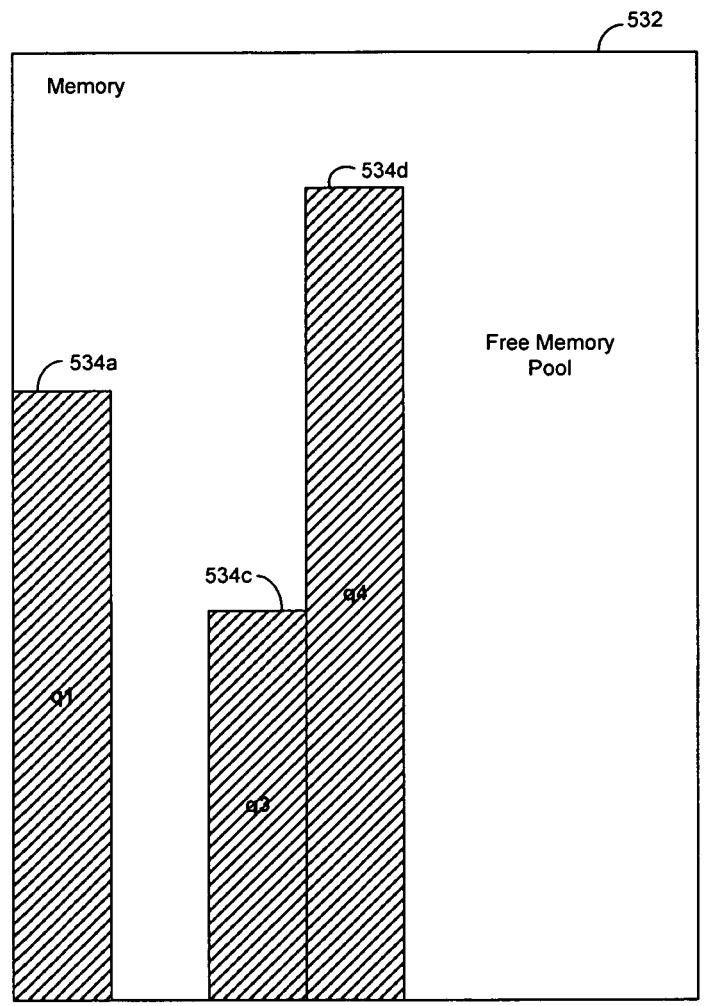
FIG. 5D is a diagram illustrating a pool of memory being allocated to queues q1, q3, and q4, in accordance with an embodiment of the invention.

FIG. 5D is a diagram illustrating a pool of memory being allocated to queues q1, q3, and q4, in accordance with an embodiment of the invention. Referring to FIG. 5D, there is shown a memory 532 that comprises a plurality of allocated queues q1 534a, q3 534c and q4 534d. The remaining free pool of memory remains available to be allocated. There is currently no flow for q2 and so no memory is utilized for q2.

Figure 5E:
FIG. 5E is a diagram illustrating a pool of memory being allocated to queues q1, q3, q4, q6 and q7, in accordance with an embodiment of the invention.

FIG. 5E is a diagram illustrating a pool of memory being allocated to queues q1, q3, q4, q6 and q7, in accordance with an embodiment of the invention. Referring to FIG. 5E, there is shown a memory 542 that comprises a plurality of allocated queues q1 544a, q3 544c, q4 544d, q6 544f and q7 544g. When compared to FIG. 5D, additional memory was allocated from the free pool of memory for queues q6 544f and q7 544g. Additionally, some of the memory that was originally allocated to queues q1 534a and q4 534d was de-allocated and returned to the free pool of memory. Moreover, since queue q3 544c required additional memory, more memory was allocated from the free pool of buffers to queue q3 544c. The remaining free pool of memory remains available to be allocated. There is currently no flow for queues, q2 and q5 and as a result no memory is utilized for queues, q2 and q5.

Figure 5F:
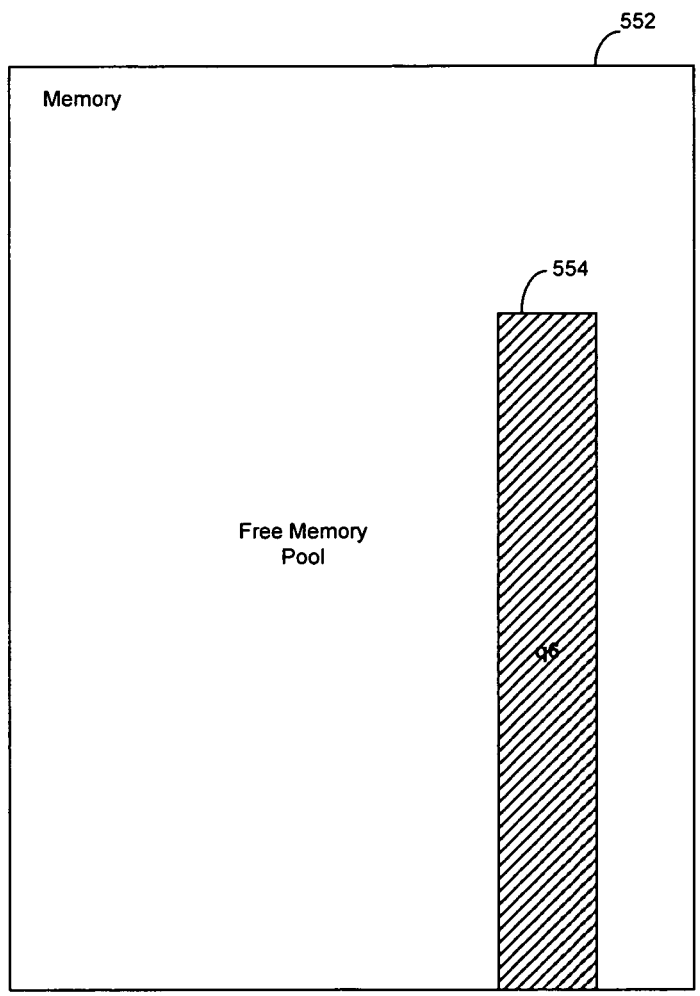
FIG. 5F is a diagram illustrating a pool of memory being allocated only to queue q6, in accordance with an embodiment of the invention.

FIG. 5F is a diagram illustrating a pool of memory being allocated only to queue q6, in accordance with an embodiment of the invention. Referring to FIG. 5F, there is shown a memory 552 that comprises an allocated queue q6 554. The remaining free pool of memory remains available to be allocated. This dynamic allocation of resources as they are needed may be useful in, for example, desktop and server based applications where traffic may be bursty and there is an uneven distribution of traffic. In an embodiment of the invention, a method may be provided for rapidly configuring the buffers to handle a sudden shift in the traffic from port 1 106 to port 2 104. In another embodiment of the invention, the system may enable detection of frames being dropped and accordingly allocate more memory resources to mitigate the loss of frames.

Figure 6:
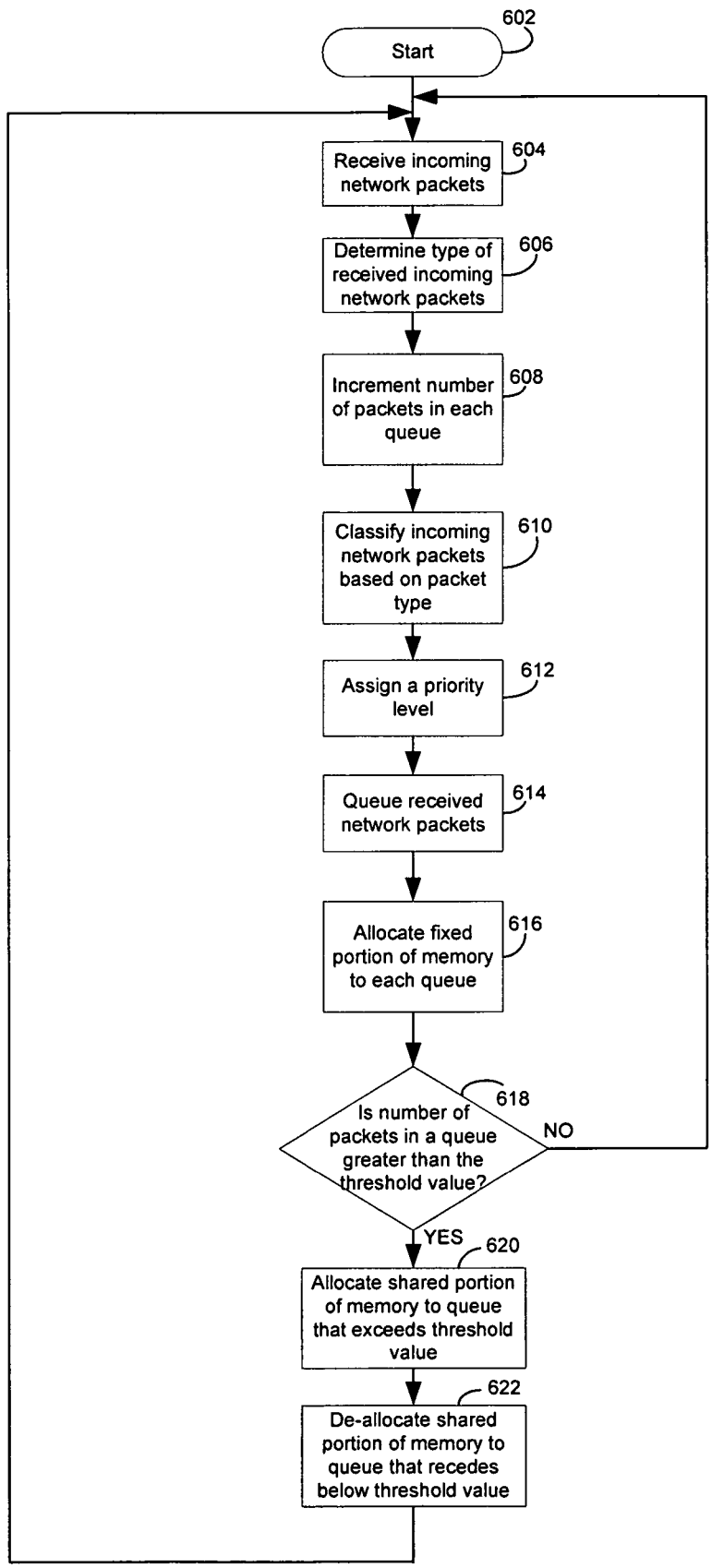
FIG. 6 is a flowchart illustrating a method for implementation of an adaptive queue and buffer control based on monitoring in packet network switches, in accordance with an embodiment of the invention.

FIG. 6 is a flowchart illustrating a method for implementation of an adaptive queue and buffer control based on monitoring in packet network switches, in accordance with an embodiment of the invention. Referring to FIG. 6, exemplary steps may begin at step 602. In step 604, a plurality of network packets may be received at a port in a switching device. In step 606, the type of at least a portion of the plurality of received packets may be determined. In step 608, the number of occurrences of a particular type of data contained in the received network packets in each queue may be incremented. In step 610, each of the plurality of received network packets may be classified based on the type of data contained in the received network packets, for example, by the classifier 406. In 612, a priority level may be assigned to each of the classified plurality of received network packets. In step 614, each of the classified plurality of received network packets may be queued based on the assigned priority level.

In step 616, a fixed portion of memory may be allocated to a queue in the network switching device 402 based on a number of the classified plurality of received network packets. In step 618, it may be determined whether a queue in the network switching device 402 that stores the classified plurality of received network packets based on the assigned priority level exceeds a threshold value 508 within a time period. If the queue in the network switching device 402 that stores the classified plurality of received network packets based on the assigned priority level does not exceed the threshold value 508 within the time period, control returns to step 604. If the queue in the network switching device 402 that stores the classified plurality of received network packets based on the assigned priority level exceeds the threshold value 508 within the time period, control passes to step 620. In step 620, a shared portion of memory may be allocated to the queue in the network switching device 402. In step 622, the shared portion of the memory 504 may be de-allocated to a pool of free memory resources 522 (FIG. 5C), if the queue in the network switching device 402 that stores the classified plurality of received network packets based on the assigned priority level recedes below the threshold value 508 within the time period. Control then returns to step 604.

Certain aspects of the invention may provide a method and system that classifies each of a plurality of received network packets in a network switching device 402 based on a type of data contained in the received network packets, for example, by the classifier 406. A priority level may be assigned to each of the classified plurality of received network packets in the network switching device 402 based on the type of data contained in the received network packets. Each of the classified plurality of received network packets in the network switching device 402 may be queued based on the assigned priority level. Buffers may be allocated dynamically to each of the classified plurality of received network packets in the network switching device 402 based on the assigned priority level.

If there are a few VoIP connections active, the amount of low jitter buffers may be minimal. As the number of simultaneous VoIP connections increase, the network switching device 402 may allocate more reserved/guaranteed buffers on the ports that have these connections. For example, a downlink port 106 may have one VoIP phone and one PC and an uplink port 104 may aggregate the downlink port's 106 simultaneous traffic. If the downlink port 106 VoIP phone is active, the uplink port's 104 buffer may overflow. Active buffer management may allow the network switching device 402 to determine where buffers may be required to avoid overflow.

At least a first portion of memory may be allocated to a queue in the network switching device 402 based on a number of the classified plurality of received network packets. It may be determined whether a queue in the network switching device 402 that stores the classified plurality of received network packets based on the assigned priority level exceeds a threshold value 508 within a time period. At least a second portion of memory may be allocated to the queue in the network switching device 402, if the queue in the network switching device 402 that stores the classified plurality of received network packets based on the assigned priority level exceeds the threshold value 508 within the time period. For example, a fixed portion of the memory 506 (FIG. 5A) may be utilized to store a plurality of packet queues, q1 510*a*, q2 510*b*, q3 510*c*, q4 510*d*, q5 510*e*, q6 510*f*, and q7 510*g*, where each queue is pre-allocated. Various portions of the shared memory 504 may be dynamically allocated to any of the queues. The fixed memory 506 may be pre-assigned or pre-reserved for each queue.

The shared portion of memory 504 may be de-allocated to a pool of free memory resources 522 (FIG. 5C), if the queue in the network switching device 402 that stores the classified plurality of received network packets based on the assigned priority level recedes below the threshold value 508 within the time period. The system may detect the number of classified network packets being dropped by the network switching device 402, and accordingly, allocate the shared portion of memory 504 to a queue in the network switching device 402 based on the detected number of classified network packets being dropped by the network switching device 402.

Another embodiment of the invention may provide a machine-readable storage, having stored thereon, a computer program having at least one code section executable by a machine, thereby causing the machine to perform the steps as described above for adaptive queue and buffer control based on monitoring in a packet network switch.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for handling data in a communication network, the method comprising:
   pre-allocating memory from a pool of memory in a network switching device based on anticipation of a type of application data being handled by a particular port of said network switching device according to packet classification and tracking; and
   dynamically allocating and deallocating memory from said pool of memory for said particular port of said network switching device based on changes to said application data.

2. The method according to claim 1, further comprising allocating at least a first portion of said pool of memory to a queue in said network switching device based on a number of classified plurality of received network packets.

3. The method according to claim 1, further comprising determining whether a queue in said network switching device that stores a classified plurality of received network packets based on an assigned priority level exceeds a threshold value within a time period.

4. The method according to claim 3, further comprising if said queue in said network switching device that stores said classified plurality of received network packets based on said assigned priority level exceeds said threshold value within said time period, allocating at least a second portion of said pool of memory to said queue in said network switching device.

5. The method according to claim 4, further comprising if said queue in said network switching device that stores said classified plurality of received network packets based on said assigned priority level recedes below said threshold value within said time period, de-allocating said at least second portion of said pool of memory to said queue in said network switching device.

6. The method according to claim 1, further comprising detecting a number of classified network packets being dropped by said network switching device.

7. The method according to claim 6, further comprising allocating at least a second portion of said pool of memory to a queue in said network switching device based on said detection of said number of said classified network packets being dropped by said network switching device.

8. A non-transitory computer-readable storage medium having stored thereon, a computer program having at least one code section for handling data in a communication network, the at least one code section being executable by a machine for causing the computer to perform steps comprising:

pre-allocating memory from a pool of memory in a network switching device based on anticipation of a type of application data being handled by a particular port of said network switching device according to packet classification and tracking; and dynamically allocating and deallocating memory from said pool of memory for said particular port of said network switching device based on changes to said application data.

9. The non-transitory computer-readable storage medium according to claim 8, further comprising code for allocating at least a first portion of said pool of memory to a queue in said network switching device based on a number of classified plurality of received network packets.

10. The non-transitory computer-readable storage medium according to claim 8, further comprising code for determining whether a queue in said network switching device that stores a classified plurality of received network packets based on an assigned priority level exceeds a threshold value within a time period.

11. The non-transitory computer-readable storage medium according to claim 10, further comprising code for allocating at least a second portion of said pool of memory to said queue in said network switching device, if said queue in said network switching device that stores said classified plurality of received network packets based on said assigned priority level exceeds said threshold value within said time period.

12. The non-transitory computer-readable storage medium according to claim 11, further comprising code for de-allocating said at least second portion of said pool of memory to said queue in said network switching device, if said queue in said network switching device that stores said classified plurality of received network packets based on said assigned priority level recedes below said threshold value within said time period.

13. The non-transitory computer-readable storage medium according to claim 8, further comprising code for detecting a number of classified network packets being dropped by said network switching device.

14. The non-transitory computer-readable storage medium according to claim 13, further comprising code for allocating at least a second portion of said pool of memory to a queue in said network switching device based on said detection of said number of said classified network packets being dropped by said network switching device.

15. A system for handling data in a communication network, the system comprising:

circuitry that enables pre-allocation of memory from a pool of memory in a network switching device based on anticipation of a type of application data being handled by a particular port of said network switching device according to packet classification and tracking; and circuitry that enables dynamic allocation and deallocation of memory from said pool of memory for said particular port of said network switching device based on changes to said application data.

16. The system according to claim 15, further comprising circuitry that enables allocation of at least a first portion of said pool of memory to a queue in said network switching device based on a number of classified plurality of received network packets.

17. The system according to claim 15, further comprising circuitry that enables determining whether a queue in said network switching device that stores a classified plurality of received network packets based on an assigned priority level exceeds a threshold value within a time period.

18. The system according to claim 17, further comprising circuitry that enables allocation of at least a second portion of said pool of memory to said queue in said network switching device, if said queue in said network switching device that stores said classified plurality of received network packets based on said assigned priority level exceeds said threshold value within said time period.

19. The system according to claim 18, further comprising circuitry that enables de-allocation of said at least second portion of said pool of memory to said queue in said network switching device, if said queue in said network switching device that stores said classified plurality of received network packets based on said assigned priority level recedes below said threshold value within said time period.

20. The system according to claim 15, further comprising circuitry that enables detection of a number of said classified network packets being dropped by said network switching device.

21. The system according to claim 20, further comprising circuitry that enables allocation of at least a second portion of said pool of memory to a queue in said network switching device based on said detection of said number of classified network packets being dropped by said network switching device.

22. The system according to claim 15, wherein said network switching device comprises a network switch.

* * * * *